(12) United States Patent
Jundt et al.

(10) Patent No.: US 7,684,875 B2
(45) Date of Patent: Mar. 23, 2010

(54) METHODS AND APPARATUS TO CONFIGURE PROCESS CONTROL SYSTEM INPUTS AND OUTPUTS

(75) Inventors: Larry Oscar Jundt, Round Rock, TX (US); Kent Allan Burr, Round Rock, TX (US); Gary Keith Law, Georgetown, TX (US); William George Irwin, Austin, TX (US); Marty James Lewis, Cedar Park, TX (US); Michael George Ott, Austin, TX (US); Robert Burke Havekost, Elgin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 315 days.

(21) Appl. No.: 11/670,835

(22) Filed: Feb. 2, 2007

(65) Prior Publication Data

US 2008/0189441 A1 Aug. 7, 2008

(51) Int. Cl.
*G05B 11/01* (2006.01)
(52) U.S. Cl. .............................. 700/19; 713/100; 710/8
(58) Field of Classification Search .................. 700/19; 713/100; 710/16, 8; 709/220
See application file for complete search history.

(56) References Cited

U.S. PATENT DOCUMENTS

| | | | |
|---|---|---|---|
| 4,803,623 A * | 2/1989 | Klashka et al. ................. 710/8 |
| 5,158,464 A | 10/1992 | Landrini | |
| 5,432,711 A | 7/1995 | Jackson et al. | |
| 5,980,078 A * | 11/1999 | Krivoshein et al. ............. 700/1 |
| 2003/0014536 A1 | 1/2003 | Christensen et al. | |
| 2004/0199925 A1 * | 10/2004 | Nixon et al. ................. 719/315 |
| 2005/0055427 A1 * | 3/2005 | Frutiger et al. .............. 709/220 |
| 2006/0224881 A1 * | 10/2006 | Pierce et al. ................. 713/100 |
| 2006/0241913 A1 | 10/2006 | De Groot et al. | |
| 2007/0094423 A1 * | 4/2007 | Atkinson ..................... 710/16 |

FOREIGN PATENT DOCUMENTS

WO WO0131407 5/2001

OTHER PUBLICATIONS

Gray Jr., James O., Integration Foundation Fieldbus Into a Distributed Control System, Foundation Fieldbus in the real world, Seminar Amsterdam, Nov. 30, 2000, 35 pages.
Burr et al., U.S. Appl. No. 11/533,259, entitled "Apparatus and Methods to Communicatively Couple Field Devices to Controllers in a Process Control System", filed on Sep. 19, 2006, 80 pages.
UK Intellectual Property Office, Examination Opinion for Application No.: GB0800692.6, Apr. 22, 2008, 1 page.
UK Intellectual Property Office, Search Report under Section 17 for Application No.: GB0800692.6, Apr. 21, 2008, 1 page.

* cited by examiner

*Primary Examiner*—Albert DeCady
*Assistant Examiner*—Steven R Garland
(74) *Attorney, Agent, or Firm*—Hanley, Flight & Zimmerman, LLC

(57) ABSTRACT

Methods and apparatus to configure process control system inputs and outputs are disclosed. A disclosed example method comprises obtaining a tag of a process control device from the input/output device, and associating the process control device with a process control module based on the obtained tag.

23 Claims, 7 Drawing Sheets

METHODS AND APPARATUS TO CONFIGURE PROCESS CONTROL SYSTEM INPUTS AND OUTPUTS

FIELD OF THE DISCLOSURE

This disclosure relates generally to process control systems and, more particularly, to methods and apparatus to configure process control system inputs and outputs.

BACKGROUND

Process control systems, like those used in chemical, petroleum, pharmaceutical, pulp and paper, and/or other manufacturing processes, typically include one or more process controllers communicatively coupled to at least one host (e.g., an operator workstation) and to one or more process control devices (e.g., field devices) configured to communicate via analog, digital or combined analog/digital communication signals and/or protocols. The field devices, which may be, for example, device controllers, valves, valve actuators, valve positioners, switches, transmitters (e.g., temperature, pressure, flow rate, and chemical composition sensors) and/or any combinations thereof, perform functions within the process control system such as opening and/or closing valves and measuring and/or inferring process parameters. A process controller receives signals indicative of process measurements made by the field devices and/or other information pertaining to the field devices, uses this information to implement a control routine, and generates control signals that are sent over buses and/or other communication lines to the field devices to control the operation of the process control system.

The field devices may be communicatively coupled to the process controller(s) using two-wire interfaces in a point-to-point (e.g., one field device communicatively coupled to a field device bus) and/or a multi-drop (e.g., a plurality of field device communicatively coupled to a field device bus) wiring connection arrangements, and/or with wireless communications. Some field devices are configured to operate using relatively simple commands and/or communications (e.g., an ON command and an OFF command). Other more complex field devices may require more commands and/or more communication information, which may or may not include simple commands. For example, more complex field devices may communicate analog values with digital communications superimposed on the analog values using, for example, a Highway Addressable Remote Transducer (HART) communication protocol. Some field devices may use entirely digital communications (e.g., a FOUNDATION Fieldbus communication protocol).

In a process control system, each field device is typically coupled to a process controller via an input/output (I/O) card and/or I/O port of an I/O gateway, and a respective communication medium (e.g., a two-wire cable, a wireless link, and/or an optical fiber). Thus, a plurality of communication media are required to communicatively couple the plurality of field devices to the process controller(s). Often, the plurality of communication media coupled to the field devices are routed through one or more field junction boxes, at which point, the plurality of communication media are coupled to respective communication media (e.g., respective two-wire conductors) of a multi-conductor cable used to communicatively couple the field devices to the process controller(s) via one or more I/O cards.

Information from the field devices and/or the process controller(s) is usually made available over a data highway and/or communication network to one or more other hardware devices, such as operator workstations, personal computers, data historians, report generators, centralized databases, etc. Such devices are typically located in control rooms and/or other locations remotely situated relative to the harsher plant environment. These hardware devices, for example, run applications that enable an operator to perform any of a variety of functions with respect to the process(es) of a process plant, such as changing settings of the process control routine (s), modifying the operation of the control modules within the process controllers and/or the field devices, viewing the current state of the process(es), viewing alarms generated by field devices and/or controllers, simulating the operation of the process(es) for the purpose of training personnel and/or testing the process control software, maintaining and/or updating a configuration database, etc.

As an example, the DeltaV™ control system sold by Fisher-Rosemount Systems, Inc. an Emerson Process Management company supports multiple applications stored within and/or executed by different devices located at potentially diverse locations within a process plant. A configuration application, which resides in and/or is executed by one or more operator workstations, enables users to create and/or change process control modules, and/or download process control modules via a data highway and/or communication network to dedicated process controllers. Typically, these control modules are made up of communicatively coupled and/or interconnected function blocks that perform functions within the control scheme based on received inputs and/or that provide outputs to other function blocks within the control scheme. In addition to defining a control scheme, the configuration application also allows the configuration, allocation and/or definition of a specific I/O port and/or I/O channel for each field device. The I/O ports and/or I/O channels for field devices are subsequently configured into the process controllers and/or I/O gateways to facilitate communication between the process controllers and the field devices.

The configuration application may further allow a configuration engineer and/or operator to create and/or change operator interfaces that are used, for example, by a viewing application to display data to an operator and/or to enable the operator to change settings and/or parameters, such as set points, within the process control routines. Each process controller and, in some cases, field devices, stores and/or executes a controller application that runs the control modules assigned to implement actual process control functionality. The viewing applications, which may be run on, for example, one or more operator workstations, receive data from the controller application via the data highway, and/or display such data for process control system engineers, operators, or other users using user interfaces that may provide any of a number of different views, such as an operator's view, an engineer's view, a technician's view, etc. A data historian application is typically stored in and/or executed by a data historian device that collects and/or stores some or all of the data provided across the data highway. A configuration database application may run in yet another computer communicatively coupled to the data highway to store the current process control routine configuration(s) and/or data associated therewith. Alternatively, configuration application(s), viewing application(s), data historian application(s), configuration database(s) and/or configuration database application (s) may be located in and/or executed by any number of workstations including, for example, a single workstation.

SUMMARY

Methods and apparatus for configuring process control system inputs and/or outputs are disclosed. Input/Output (I/O) devices (e.g., I/O slices) that electrically couple process control devices (e.g., field devices) to I/O gateways and that can be programmed with and/or which can automatically obtain field device tags for the field devices are employed. A field device tag is a logical entity that includes the type of the field device and/or an assigned name (i.e., a tag) for the field device. For example, an installer can program into an I/O slice the tag of the field device that is electrically coupled (i.e., wired) to the I/O slice. Additionally or alternatively, a smart field device (e.g., a Fieldbus device) can be programmed with the tag and the I/O slice can automatically obtain the tag directly from the smart field device. Such field device tags is used to automate the association of field devices to particular I/O ports and/or I/O channels and, thus, to particular control modules (e.g., module class objects). An I/O gateway is used to sense the I/O slices (and their associated field device tags) that are electrically coupled to the I/O ports and/or I/O channels of the I/O gateway. The sensed field device tags are provided to a configuration application that compares the sensed field device tags to field device tags previously configured into process control modules. When matches are identified and/or located, the sensed I/O port and/or I/O channel for the matching field device may be automatically bound to the process control module, thereby, automatically coupling the process control module to its intended field device(s).

Additionally or alternatively, field device tags can be used to verify a prior configuration of field devices to particular I/O ports and/or I/O channels. An I/O gateway is used to sense the I/O slices (and their associated field device tags) that are communicatively coupled to the I/O ports and/or I/O channels of the I/O gateway. The sensed field device tags are provided to a configuration application that compares the sensed field device tags to field device tags previously configured into process control modules. When a match is identified and/or located, the sensed I/O port and/or I/O channel for the sensed field device are compared to the I/O port and/or I/O channel previously configured into the control module for the field device. If the I/O port and/or I/O channel do not match, an operator and/or installer can be notified so that the field device can be electrically coupled to the correct I/O slice. Process control system I/O mismatches can be indicated via a configuration application user interface and/or may be indicated via an error indicator on the I/O slice (e.g., a light emitting diode (LED)). Additionally or alternatively, the matching of configured field device tags and sensed field device tags can be performed by the I/O gateway with a mismatch displayed on the sensed I/O slice and/or a corresponding error indication provided to the configuration application. In either case, the I/O gateway is loaded with a configuration that includes for each field device tag an assigned I/O port and/or I/O channel. The downloaded configuration is compared to the sensed field device tags, I/O ports and I/O channels to identify any mismatches.

DETAILED DESCRIPTION

Although the following describes example apparatus and methods including, among other components, software and/or firmware executed on hardware, it should be noted that such examples are merely illustrative and, thus, should not be considered as limiting. For example, it is contemplated that any or all of these hardware, software, and firmware components could be embodied exclusively in hardware, exclusively in software, or in any combination of hardware and software. Accordingly, while the following describes example apparatus and methods, persons of ordinary skill in the art will readily appreciate that the examples provided are not the only way to implement such apparatus and methods.

Figure 1:
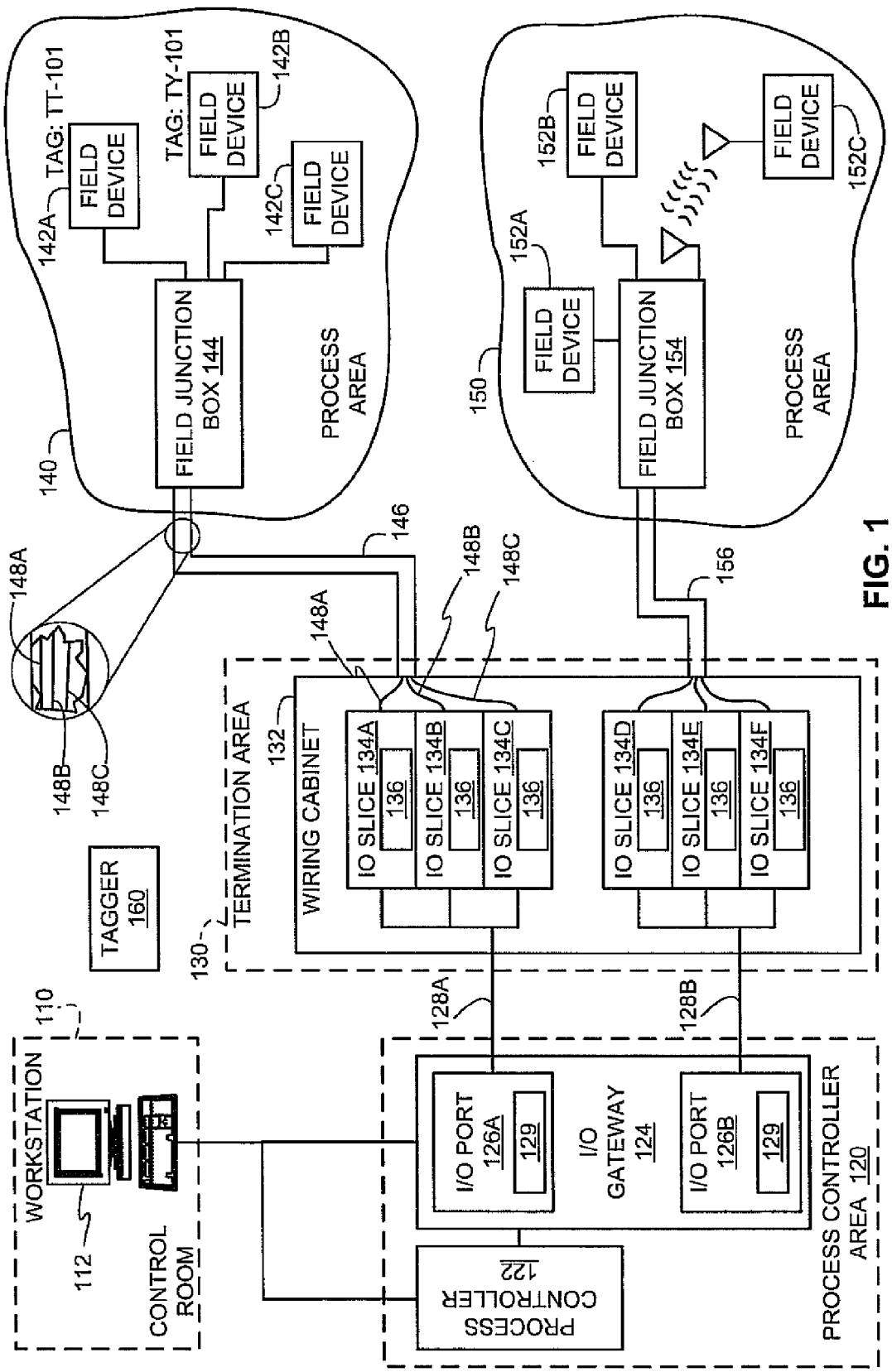
FIG. 1 is a schematic illustration of an example process control system.

FIG. 1 is a schematic illustration of an example process control system that includes a control room 110, a process controller area 120, a termination area 130, and one or more process areas, two of which are illustrated in FIG. 1 with reference numerals 140 and 150. The example control room 110 of FIG. 1 includes one or more workstations (one of which is illustrated in FIG. 1 with reference numeral 112) within an environment that is safely accessible by humans. The example workstation 112 of FIG. 1 implements and/or executes user applications (e.g., configuration applications) that users (e.g., engineers, operators, etc.) can utilize and/or access to configure and/or control operations of the process control system by, for example, changing variable values, process control functions, etc.

The example workstation 112 of FIG. 1 is also used to configure inputs and outputs for the example process control system. As an example, the DeltaV™ control system sold by Fisher-Rosemount Systems, Inc. an Emerson Process Management company supports the configuration of process control functions using module and/or unit class objects. During the configuration of such objects, a field device tag is configured (e.g., associated) with each input and/or output block of each object. As used herein, a field device tag is a logical entity that includes information identifying the type of the field device and an assigned name (i.e., tag) for the field device. In some examples, the configuration also includes the assignment of the field device tag to a particular input/output (I/O) port and/or I/O channel of an I/O gateway. In other examples, the binding and/or associating of a field device tag to a particular I/O port and/or I/O channel of an I/O gateway is completed automatically, as described in more detail below. If the configuration of the objects includes the assignment of the field device tags to I/O ports and/or I/O channels, the field device tags can, as described below, be used to verify the configured assignment of I/O ports and/or I/O channels against the actual wiring of the field devices to I/O ports and/or I/O channels. For example, field device tags can be configured to process control modules by importing instrument lists in the form of a spreadsheet, comma-separated values and/or eXtensible Markup Language (XML) files.

Such instrument lists may also used to configure I/O devices (e.g., I/O slices) with the device tags for attached field devices 142A-C, 152A-C.

Example methods for configuring a set of module objects for process control systems are described in U.S. Pat. No. 7,043,311, entitled "Module Class Objects in a Process Plant Configuration System"; and U.S. patent application Ser. No. 11/537,138, entitled "Methods and Module Class Objects to Configure Equipment Absences in Process Plants," and filed on Sep. 29, 2006. U.S. Pat. No. 7,043,311 and U.S. patent application Ser. No. 11/537,138 are each hereby incorporated by reference in their entireties.

The example process areas 140, 150 of FIG. 1 each include one or more process control devices (e.g., field devices) 142A-C, 152A-C, respectively, that perform operations (e.g., controlling valves, controlling motors, controlling boilers, monitoring, measuring parameters, etc.) associated with performing a particular process (e.g., a chemical process, a petroleum process, a pharmaceutical process, a pulp and paper process, etc.). One or both of the process areas 140, 150 may not be accessible by humans due to harsh environment conditions (e.g., relatively high temperatures, airborne toxins, unsafe radiation levels, etc.)

The example process controller area 120 of FIG. 1 includes one or more process controllers (one of which is illustrated in FIG. 1 with reference numeral 122) communicatively coupled to the example workstation 112 and to the example field devices 142A-C, 152A-C via one or more I/O gateways (one of which is illustrated in FIG. 1 with reference numeral 124). The example I/O gateway 124 of FIG. 1 includes one or more I/O ports 126A, 126B that communicatively couple the I/O gateway 124 to one or more wiring cabinets (one of which is illustrated in FIG. 1 with reference numeral 132). The example I/O ports 126A, 126B of FIG. 1 translate information received from the field devices 142A-C, 152A-C to a signal, format and/or protocol compatible with the process controller 122 and/or translate information from the process controller 122 to a signal, format and/or protocol compatible with the field devices 142A-C, 152A-C. As illustrated in FIG. 1, each I/O port 126A, 126B can process input and/or output signals for more than one field device 142A-C, 152A-C. As such, each I/O port 126A, 126B assigns different field devices 142A-C, 152A-C to different I/O channels of an I/O port 126A, 126B.

While the example I/O gateway 124 of FIG. 1 is illustrated separately from the example process controller 122, the process controller 122 may implement the I/O gateway 124. Moreover, the process controller 122 may implement any number of I/O gateways 124, and/or any number and/or types of I/O ports 126A, 126B.

The example process controller 122 of FIG. 1 automates control of the field devices 142A-C, 152A-C by executing one or more process control strategies and/or routines constructed and/or configured via the example workstation 112. An example process strategy and/or routine involves measuring a pressure using a pressure sensor field device (e.g., the example field device 152A) and automatically sending a command to a valve positioner (e.g., the example device 152B) to open or close a fluid control valve (not shown) based on the pressure measurement. To correctly control the field devices 142A-C, 152A-C, the example process controller 122 and the example I/O gateway 124 are configured with parameters that specify which field device 142A-C, 152A-C is electrically and/or communicatively coupled to which I/O port 126A, 126B and/or which I/O channel of an I/O port 126A, 126B at the I/O gateway 124.

The example termination area 130 of FIG. 1 includes the example wiring cabinet 132 that enables the process controller 122 to communicate with one or more of the field devices 142A-C, 152A-C in one or more of the process areas 140, 150. In particular, the example wiring cabinet 132 of FIG. 1 includes a plurality of I/O slices (six of which are illustrated in FIG. 1 with reference numerals 134A-F) that are used to translate, marshal, organize, or route signals between the example field devices 142A-C, 152A-C and one or more of the example I/O ports 126A, 126B. The example I/O slices 134A-F of FIG. 1 are smart devices that can be programmed with and/or automatically obtain information about a communicatively coupled field device 142A-C, 152A-C. For example, the example I/O slices 134A-F are configured to store a value and/or string that identifies the type of a coupled field device 142A-C, 152A-C, and a logical name and/or device tag that uniquely identifies the field device 142A-C, 152A-C. For instance, the example I/O slice 134A contains information identifying the example field device 142A as a temperature transmitter having a device tag of "TT-101."

As described above, device tags are used to logically associate and/or assign an input and/or output block of a control module to a particular field device 142A-C, 152A-C. Once a device tag is associated with a particular I/O port 126A, 126B and/or I/O channel, the field device becomes bound to the control module. Such process control system I/O binding may occur automatically based upon the sensing of I/O slices 134A-F and/or field devices 142A-C-, 152A-C at the example I/O gateway 124. Additionally or alternatively, such binding may occur during configuration of the process control module. When binding occurs during configuration of the control module, the example I/O gateway 124 can be used to sense the I/O slices 134A-F and/or the field devices 142A-C, 152A-C coupled to the I/O gateway 124, thereby, allowing for the verification of the proper binding of process control modules to their respective field devices 142A-C, 152A-C.

The example I/O slices 134A-F of FIG. 1 can be programmed with the device tag of a field device 142A-C, 152A-C by a hand-held programmer and/or tagger 160. The example tagger 160 of FIG. 1 may be communicatively coupled to an I/O slice 134A-F and used to program information into the I/O slice 134A-F (e.g., field device type and field device tag). In some instances, the I/O slices 134A-F are programmed as each of the field devices 142A-C, 152A-C is wired to an I/O slice 134A-F. However, any sequence of wiring field devices 142A-C, 152A-C to I/O slices 134A-F and programming I/O slices 134A-F may be used. Additionally or alternatively, an I/O slice 134A-F can automatically obtain the device type and/or logical tag of a smart field device 142A-C, 152A-C (e.g., a Fieldbus device) directly from the smart field device 142A-C, 152A-C.

To indicate at the wiring cabinet 132 which I/O slice 134A-F is connected to which field device 142A-C, 152A-C, each of the example I/O slices 134A-F of FIG. 1 is provided with a termination labeler 136. A termination labeler 136 includes an electronic display (e.g., a liquid crystal display (LCD)) and components to determine which field device or devices 142A-C, 152A-C is/are connected to the I/O slice 134A-F corresponding to the termination labeler 136. The example I/O slices 134A-F and/or the example labelers 136 may also include any number and/or type(s) of light emitting diodes (LEDs) that may be used to display status information (e.g., a device tag mismatch). Additionally or alternatively, a termination labeler 136 may implement a conventional wire marking system rather than an electronic display. Moreover, the termination labeler 136 may not implement an electronic display and instead provide information and/or data to be displayed to a communicatively coupled device, such as the example tagger 160

In some example implementations, the displays 136 and/or the LEDs are mounted on and/or to the wiring cabinet 132 instead of the I/O slices 134A-F. Each of the displays 136 is associated with a respective I/O slice socket. In this manner, when an I/O slice 134A-F is removed from the wiring cabinet 132, a corresponding display 136 remains in the wiring cabinet 132 for use by a subsequently connected and/or inserted I/O slice 134A-F.

Example manners of implementing the example I/O slices 134A-F, for marshalling field devices 142A-C, 152A-C via wiring cabinets 132 and/or using I/O ports 126A, 126B and I/O gateways 124 are described in U.S. patent application Ser. No. 11/533,259, entitled "Apparatus and Methods to Communicatively Couple Field Devices to Controllers in a Process Control System," and filed on Sep. 19, 2006. U.S. patent application Ser. No. 11/533,259 is hereby incorporated by reference in its entirety.

To route signals between the field devices 142A-C, 152A-C and the wiring cabinet 132, each of the process areas 140, 150 may include any number of field junction boxes (including possibly zero), two of which are illustrated in FIG. 1 with reference numerals 144 and 154. In the illustrated example, the field devices 142A-C are communicatively coupled to the example field junction box 144 and the field devices 152A-C are communicatively coupled to the example field junction box 154 via electrically conductive, wireless, and/or optical communication media. For example, the field junction boxes 144, 154 may be provided with one or more wired, wireless, and/or optical data transceivers to communicate with wired, wireless, and/or optical transceivers of the field devices 142A-C, 152A-C. In the illustrated example, the field junction box 154 is communicatively coupled wirelessly to the field device 152C. In an alternative example implementation, the wiring cabinet 132 may be omitted such that signals from the field devices 142A-C, 152A-C are routed from the field junction boxes 144, 154 directly to the I/O ports 126A, 126B of the I/O gateway 124. In yet another example implementation, the field junction boxes 144, 154 may be omitted such that the field devices 142A-C, 152A-C are directly connected to the example I/O slices 134A-F.

The example field devices 142A-C, 152A-C of FIG. 1 may be Fieldbus compliant valves, actuators, sensors, etc., in which case the field devices 142A-C, 152A-C communicate via a digital data bus using the well-known Fieldbus communication protocol. Of course, other types of field devices 142A-C, 152A-C and communication protocols could be used instead. For example, the field devices 142A-C, 152A-C could instead be Profibus, HART, or AS-i compliant devices that communicate via the data bus using the well-known Profibus and HART communication protocols. In some example implementations, the field devices 142A-C, 152A-C can communicate information using analog communications or discrete communications instead of digital communications. In addition, the communication protocols can be used to communicate information associated with different data types.

The example I/O slices 134A-F of FIG. 1 are communicatively coupled to the field junction boxes 144, 154 via respective multi-conductor cables 146 and 156 (e.g., a multi-bus cable). In an alternative example implementation in which the wiring cabinet 132 is omitted, the example I/O slices 134A-F can be installed in respective ones of the example field junction boxes 144, 154.

The illustrated example of FIG. 1 depicts a point-to-point configuration in which each conductor or conductor pair (e.g., bus, twisted pair communication medium, two-wire communication medium, etc.) in the multi-conductor cables 146, 156 communicates information uniquely associated with a respective one of the field devices 142A-C, 152A-C. For example, the multi-conductor cable 146 includes a first conductor 148A, a second conductor 148B, and a third conductor 148C. Specifically, the first conductor 148A is used to form a first data bus configured to communicate information between the I/O slice 134A and the field device 142A, the second conductor 148B is used to form a second data bus configured to communicate information between the I/O slice 134B and the field device 142B, and the third conductor 148C is used to form a third data bus configured to communicate information between the I/O slice 134C and the field device 142C. In an alternative example implementation using a multi-drop wiring configuration, each of the I/O slices 134A-F can be communicatively coupled with one or more field devices 142A-C, 152A-C. For example, in a multi-drop configuration, the I/O slice 134A can be communicatively coupled to the field device 142A and to another field device (not shown) via the first conductor 148A. In some example implementations, an I/O slice 134A-F can be configured to communicate wirelessly with a plurality of field devices 142A-C, 152A-C using a wireless mesh network.

Each of the example I/O slices 134A-F of FIG. 1 may be configured to communicate with a respective one of the field devices 142A-C, 152A-C using a different data and/or signal type. For example, the I/O slice 134A may include a digital field device interface to communicate with the field device 142A using digital data and/or signals while the I/O slice 134B may include an analog field device interface to communicate with the field device 142B using analog data and/or signals.

The example wiring cabinet 132 and the example I/O gateway 124 of FIG. 1 use one or more universal I/O buses (e.g., a common or shared communication bus) to communicatively couple one or more I/O slices 134A-F to one or more of the I/O ports 126A, 126B communicatively coupled to the process controller 122. Two example universal I/O buses are illustrated in FIG. 1 with reference numerals 128A and 128B. Universal I/O buses may be implemented in accordance with any wired and/or wireless standard(s), specification(s) and/or protocol(s) such as, for example, RS-485, Ethernet, universal serial bus (USB), Institute of Electrical and Electronics Engineers (IEEE) 1394, IEEE 802.11 (commonly known as Wi-Fi), Bluetooth, etc.

The example I/O slices 134A-F of FIG. 1 are configured to receive field device information from the example field devices 142A-C, 152A-C via the field device buses 146, 156 and to communicate the field device information to the I/O ports 126A-B via the universal I/O buses 128A, 128B by, for example, packetizing the field device information and communicating the packetized information to the I/O ports 126A, 126B via the universal I/O buses 128A, 128B. The field device information may include, for example, field device identification information (e.g., device tags, electronic serial numbers, etc.), field device status information (e.g., communication status, diagnostic health information (open loop, short, etc.)), field device activity information (e.g., process variable (PV) values), field device description information (e.g., field device type or function such as, for example, valve actuator, temperature sensor, pressure sensor, flow sensor, etc.), field device connection configuration information (e.g., multi-drop bus connection, point-to-point connection, etc.), field device bus or segment identification information (e.g., field device bus or field device segment via which field device is communicatively coupled to termination module), and/or field device data type information (e.g., a data type descriptor indicative of the data type used by a particular field device). The example I/O ports 126A, 126B can extract the field device information received via the example universal I/O buses 128A, 128B and communicate the field device information to the example process controller 122, which can then communicate some or all of the information to one or more workstation terminals 112 for subsequent analysis.

To communicate field device information (e.g., commands, instructions, queries, threshold activity values (e.g., threshold PV values), etc.) from workstation terminals 112 and/or the process controller(s) 122 to the example field devices 142A-C, 152A-C, the example I/O ports 126A, 126B packetize the field device information and communicate the packetized field device information to the example I/O slices 134A-F. Each of the I/O slices 134A-F extracts or depacketizes respective field device information from the packetized communications received from a respective I/O port 126A, 126B and communicates the field device information to a respective field device 142A-C, 152A-C.

The example I/O buses 128A, 128B of FIG. 1 are configured to communicate information between the I/O ports 126A, 126B and the example I/O slices 134A-F. The I/O ports 126A, 126B and the I/O slices 134A-F use an addressing scheme to enable the I/O ports 126A, 126B to identify which information corresponds to which one of the I/O slices 134A-F, and to enable the I/O ports 126A, 126B and the I/O slices 134A-F to determine which information corresponds to which of the field devices 142A-C, 152A-C. When one of the I/O slices 134A-F is connected to one of the I/O ports 126A, 126B, that I/O port 126A, 126B automatically obtains an address for the I/O slice 134A-F. In this manner, the I/O slices 134A-F can be communicatively coupled anywhere on the respective buses 128A, 128B without having to manually supply addresses to the I/O ports 126A, 126B and without having to individually wire each of the I/O slices 134A-F to the I/O ports 126A, 126B.

Using the example universal I/O buses 128A, 128B of FIG. 1 to exchange information between the process controller 122 and the I/O slices 134A-F enables defining field device-to-I/O port/channel connection routing later in a design and/or installation process. For example, the I/O slices 134A-F can be placed in various locations within the wiring cabinet 132 while maintaining access to a respective one of the I/O buses 128A, 128B.

In the illustrated example, each of the example I/O ports 126A, 128B includes a data structure 129 that stores the device tags for field devices (e.g., the field devices 142A-C, 152A-C) that are assigned to communicate with the I/O port 126A, 126B via its respective universal I/O bus 128A, 128B. The example data structures 129 can be populated by engineers, operators, and/or users via the workstation 112 using, for example, a configuration application.

Additionally or alternatively, the data structures 129 may be automatically generated by the workstation 112. For example, the example I/O gateway 124 may be directed to auto-sense which I/O slices 134A-F are communicatively coupled to its I/O ports 126A, 126B to obtain the field device tags for each field device 142A-C, 152A-C communicatively coupled to the sensed I/O slices 134A-F. For example, from the DeltaV™ Explorer™ a user of the workstation 112 can execute a function (via, for example, a button, menu, etc.) that causes the I/O gateway 124 to perform the auto-sensing. The I/O gateway 124 also obtains and/or determines the I/O channel and/or slot of the universal I/O bus 128A, 128B carrying the field device data for the sensed field devices 142A-C, 152A-C. The example I/O gateway 124 reports the collected information to the workstation 112.

At the example workstation 112 of FIG. 1, the workstation 112 compares each of the field device tags collected by the example I/O gateway 124 with the field device tags previously configured for control process modules. When a match is located, the input/output information for the field device 142A-C, 152A-C (e.g., universal bus I/O identifier, universal I/O bus slot and/or channel) is bound to the control process module for the field device 142A-C, 152A-C. When the control process module is subsequently downloaded to the process controller 122, the process controller 122 is enabled to communicate with the field device 142A-C, 152A-C based on the bound input/output information. The field device input/output information may also be used by the workstation 112 to configure the data structures 129 that are used by the I/O ports 126A, 126B and/or, more generally, by the example I/O gateway 124. In this fashion, the configuration of process control system inputs and outputs can be automatically performed based on the actual wiring of a process control system.

In one example where input/output information is bound to a block of a process control module during configuration of the process control module, the example I/O gateway 124 of FIG. 1 can be directed to auto-sense which I/O slices 134A-F are communicatively coupled to its I/O ports 126A, 126B and to obtain the field device tags for each field device 142A-C, 152A-C communicatively coupled to the sensed I/O slices 134A-F. For example, from the DeltaV™ Explorer™ a user of the workstation 112 can execute a function (via, for example, a button, menu, etc.) that causes the I/O gateway 124 to perform the auto-sensing. The I/O gateway 124 also obtains and/or determines the I/O channel and/or slot of the universal I/O bus 128A, 128B carrying the field device data for the sensed field devices 142A-C, 152A-C. The example I/O gateway 124 compares the sensed field device tags and input/output information with the field device tags and input/output information provisioned into the configuration data 129. When for a particular field device tag a mismatch is detected between sensed input/output information and provisioned input/output information, the I/O gateway 124 provides an indication of the process control system I/O mismatch by, for example, lighting a mismatch configuration LED for the corresponding I/O slice 134A-F. Additionally, if an I/O slice 134A-F does not have a field device tag for an attached field device 142A-C, 152A-C, the I/O gateway 124 can also display a potential error configuration (e.g., by lighting a different LED). Such lit LEDs or other indicators may be used by an installer and/or technician to recognize that a field device mismatch and/or unprogrammed I/O slice 134A-F condition is present. Additionally or alternatively, the I/O gateway 124 provides an indication of the I/O mismatch to the workstation 112. Such mismatch indications can be used by an engineer and/or installer to identify the incorrectly wired and/or configured field device 142A-C, 152A-C. For example, a user of the workstation 112 can use a diagnostic tool (e.g., the DeltaV™ Diagnostic explorer) to retrieve information on the sensed and configured device tags as well as the sensed and configured I/O port and/or I/O channel information in order to determine if the configuration or the wiring is at fault. Once a mis-wiring and/or a mis-configuration is identified and corrected, the process can be repeated to verify the modified control system. In this fashion, the configuration of process control system inputs and outputs can be automatically verified against the actual process control system wiring.

Figure 2:
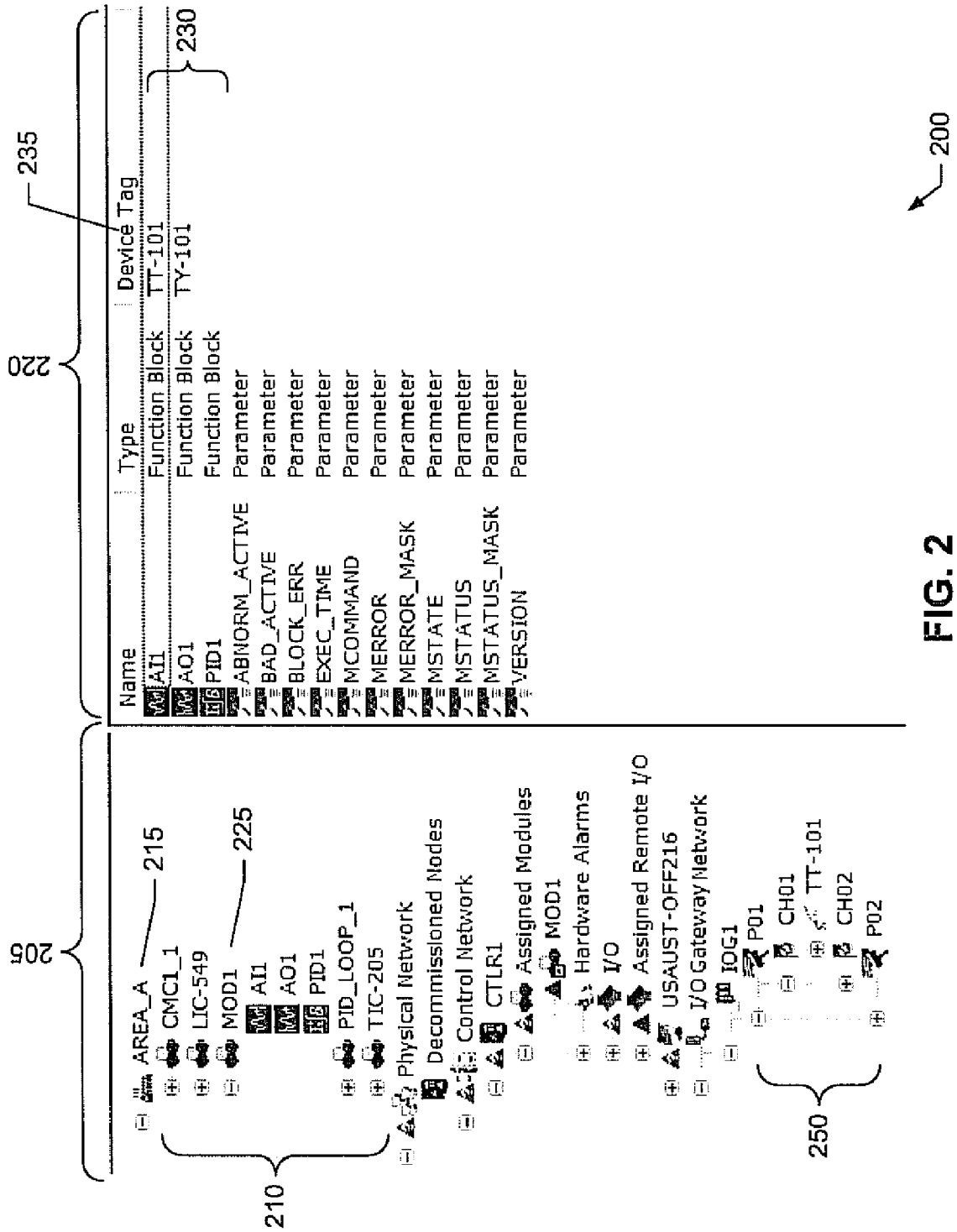
FIG. 2 is an illustration of an example user interface that may be used to display a mapping of field devices to module class objects.

FIG. 2 illustrates an example user interface 200 that displays assignment and/or configuration of device tags to function blocks. To display a hierarchy of control modules, the example user interface 200 of FIG. 2 has a left-hand portion 205. The example left portion 205 displays a list of units 210 for a process area 215 named "AREA_A."

To display function blocks and parameters, the example display 200 of FIG. 2 includes a right-hand portion 220. The example right-hand portion 220 of FIG. 2 displays a list of function blocks and/or parameters associated with a selected one of the units 210, e.g., an example "MOD1" unit 225. For each function block 230 of example MOD1 unit 225, the example right-hand portion 220 includes a device tag 235. For example, an example function block AI1 has been configured to the field device 142A-C, 152A-C that has the field device tag of "TT-101." As described in U.S. Pat. No. 7,043,311, field device tags can be configured and/or assigned to function blocks by importing instrument lists in the form of a spreadsheet, comma-separated values and/or XML files.

Persons of ordinary skill in the art will readily appreciate that the example hierarchy illustrated in the example left-hand portion 205 of FIG. 2 is merely illustrative and may be modified in any number of ways. For example, the example port and channel components 250 shown in FIG. 2 may be omitted so that a field device tag need only be associated with an I/O gateway 124. The I/O gateway 124 could use any number and/or type(s) of addressing schemes to identify and/or communicate with a particular field device 142A-C, 152A-C. However, such addressing schemes could be implemented with an installer's and/or operator's knowledge and/or involvement. Moreover, such addressing schemes need not be tied to the use of I/O ports 126A-B and/or channels of I/O ports.

Figure 3:
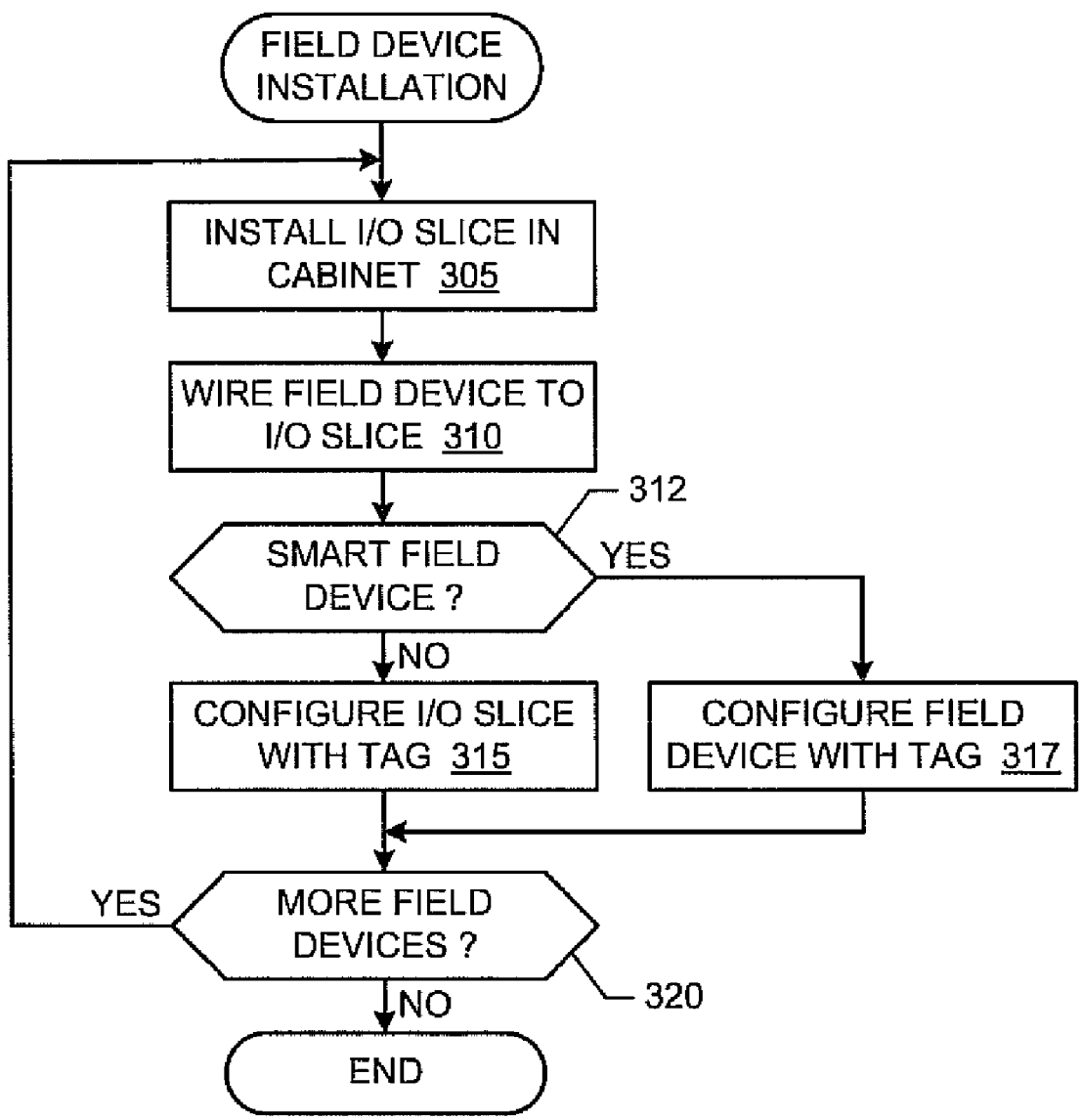
FIG. 3 is a flowchart representative of an example process that may be performed to install a field device.
Figure 4:
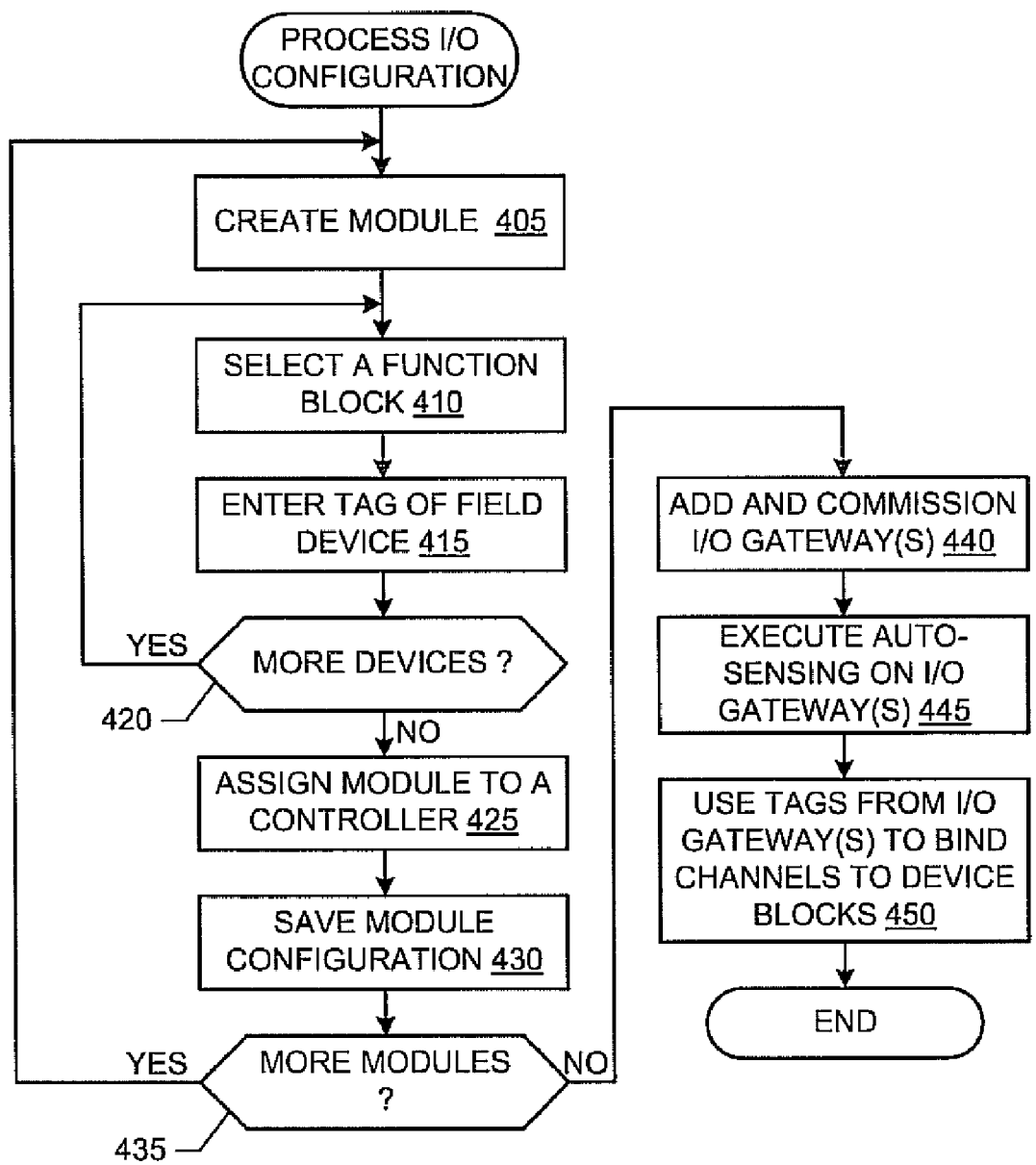
FIGS. 4 and 5 are flowcharts representative of example processes that may be performed to configure process input/output (I/O) for module class objects.
Figure 5:
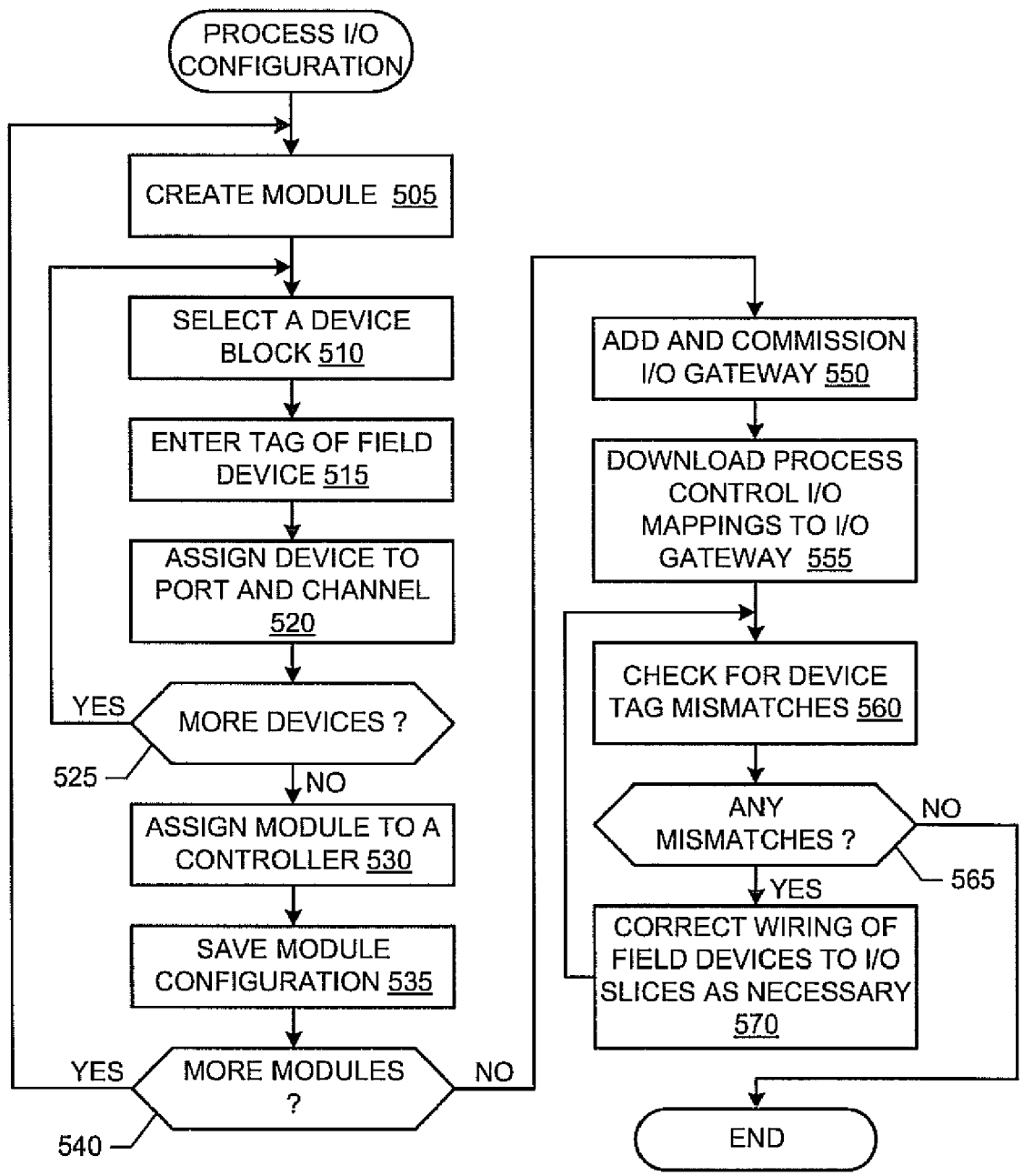
Figure 6:
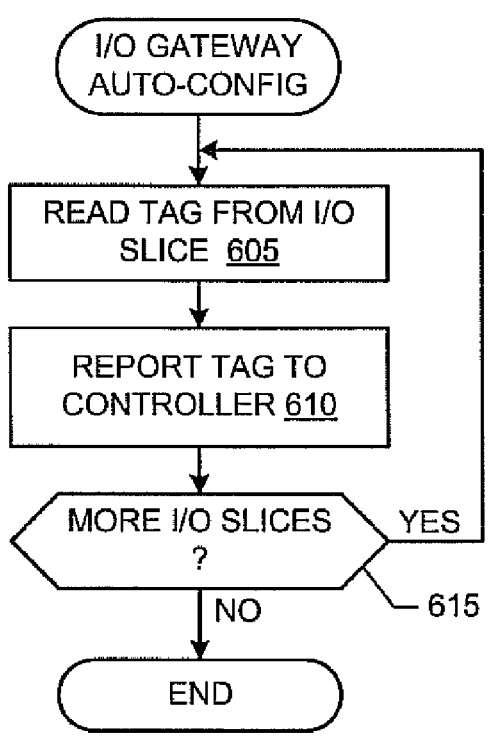
FIGS. 6 and 7 are flowcharts representative of example processes that may be performed to configure an I/O gateway.
Figure 7:
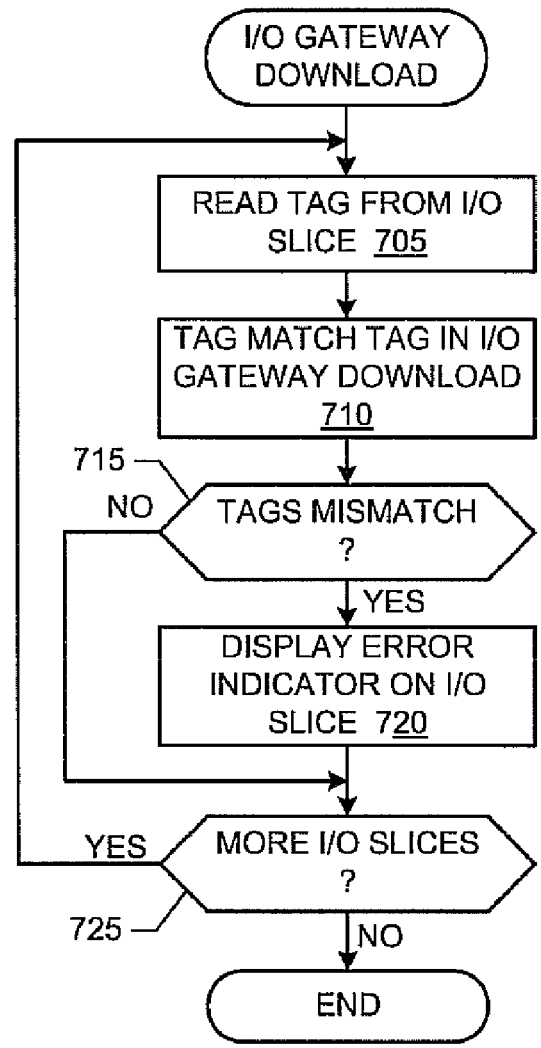

FIG. 3 is a flowchart representative of an example process that may be performed to install one or more of the example field devices 142A-C, 152A-C. FIGS. 4 and 5 are flowcharts representative of example processes that may be performed to configure process input/output (I/O) for module class objects. FIGS. 6 and 7 are flowcharts representative of example processes that may be performed to configure the example I/O gateway 124. The example processes of FIGS. 3, 4, 5, 6 and/or 7 may be performed by a processor, a controller and/or any other suitable processing device. For example, the example processes of FIGS. 3, 4, 5, 6 and/or 7 may be embodied in coded instructions stored on a tangible medium such as a flash memory, a read-only memory (ROM) and/or random-access memory (RAM) associated with a processor (e.g., the example processor 805 discussed below in connection with FIG. 8). Alternatively, some or all of the example processes of FIGS. 3, 4, 5, 6 and/or 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 3, 4, 5, 6 and/or 7 may be implemented manually or as any combination(s) of any of the foregoing techniques, for example, any combination of firmware, software, discrete logic and/or hardware. Further, although the example processes of FIGS. 3, 4, 5, 6 and 7 are described with reference to the flowcharts of FIGS. 3, 4, 5, 6 and 7, persons of ordinary skill in the art will readily appreciate that many other methods of implementing the processes of FIGS. 3, 4, 5, 6 and/or 7 may be employed. For example, the order of execution of the blocks may be changed, and/or some of the blocks described may be changed, eliminated, sub-divided, or combined. Additionally, persons of ordinary skill in the art will appreciate that any or all of the example processes of FIGS. 3, 4, 5, 6 and/or 7 may be carried out sequentially and/or carried out in parallel by, for example, separate processing threads, processors, devices, discrete logic, circuits, etc.

The example process of FIG. 3 beings with an installer and/or technician installing and/or inserting an I/O slice (e.g., one of the example I/O slices 134A-F of FIG. 1) into a wiring cabinet (e.g., the example wiring cabinet 132) (block 305). The installer and/or technician wires one or more field devices (e.g., any of the example field devices 142A-C, 152A-C) to the I/O slice (block 310). If the connected field devices is not a smart field device (block 312), the installer and/or technician configures and/or programs the I/O slice with the device tag for the connected field devices (block 315). If the connected field devices is a smart field device (block 312), the installer and/or technician configures and/or programs smart field device with the device tag (block 317). If the smart field device is configured with the device tag (block 317), the I/O slice can automatically obtain the device tag for the smart field device from the smart field device. If there are more field devices to install (block 320), the example process returns to block 305 to install the next I/O slice. If no more field devices need to be installed (block 320), the example process of FIG. 3 ends.

The example process of FIG. 4 may be performed configure process control system inputs and outputs for an example process control system. The example process of FIG. 4 begins with a configuration engineer creating a process control module (block 405). The engineer selects a function block of the control module (block 410) and configures a device tag to the control module (block 415). If there are more function blocks to configure (block 420), control returns to block 410 to configure the function block. Persons of ordinary skill in the art will readily appreciate that device tags may be configured to function blocks (blocks 410, 415 and 420) by importing a spreadsheet, comma-separated values and/or an XML file.

The configuration engineer assigns the control module to a process controller (e.g., the example process controller 122 of FIG. 1) (block 425) and saves the process control module (block 430). If more control modules are to be created and/or configured (block 435), control returns to block 405 to create and/or configure another control module.

If no more control modules are to be created and/or configured (block 435), the configuration engineer, an installer and/or a technician adds and/or commissions an I/O gateway (e.g., the example I/O gateway 124 of FIG. 1) (block 440). As directed by the configuration engineer, a configuration application directs the I/O gateway to auto-sense and report connected I/O slices and field devices (block 445). The configuration application compares the device tags of sensed field devices to those previously configured to field devices and binds I/O information for sensed field devices to corresponding function blocks (block 450). Control then exits from the example process of FIG. 4.

FIG. 5 illustrates another example process that may be performed to configure process control system inputs and outputs for an example process control system. The example process of FIG. 5 begins with a configuration engineer creating a process control module (block 505). The engineer selects a function block of the control module (block 510) and configures a device tag to the control module (block 515). The engineer also configures an I/O port and I/O channel to the function block (block 520). If there are more function blocks to configure (block 525), control returns to block 510 to configure the function block. Persons of ordinary skill in the art will readily appreciate that device tags may be configured to function blocks (blocks 510, 515, 520 and 525) by importing a spreadsheet, comma-separated values and/or an XML file.

The configuration engineer assigns the control module to a process controller (e.g., the example process controller 122 of FIG. 1) (block 530) and saves the process control module (block 535). If more control modules are to be created and/or configured (block 540), control returns to block 505 to create and/or configure another control module.

If no more control modules are to be created and/or configured (block 540), the configuration engineer, an installer and/or a technician adds and/or commissions an I/O gateway (e.g., the example I/O gateway 124 of FIG. 1) (block 550). As directed by the configuration engineer, a configuration application creates and downloads an I/O configuration (e.g., the example configuration 129 of FIG. 1) to the I/O gateway (block 555). The configuration application then directs the I/O gateway to auto-sense connected I/O slices and field devices and compare the same to those provisioned in the I/O configuration (block 560). If there are no device tag mismatches (block 565), control exits from the example process of FIG. 5. If there is at least one device tag mismatch (block 565), the configuration engineer, the technician and/or the installer identify and correct the configuration and/or wiring error (block 570). Control then returns to block 560 to check for device tag mismatches.

The example process of FIG. 6 may be performed to configure an I/O gateway (e.g., the example I/O gateway 124 of FIG. 1). The example process of FIG. 6 begins when the I/O gateway is instructed (e.g., by an application executing on the example workstation 112) to sense and report connected field devices (e.g., the example field devices 142A-C, 152A-C). The I/O gateway acquires the device tags for field devices connected to a first I/O slice (block 605) and reports the device tags to the workstation (block 610). If there are more I/O slices (block 615), control returns to block 605 to acquire the devices tags from the next I/O slice. If there are no more I/O slices, control exits from the example process of FIG. 6.

FIG. 7 illustrates another example process that may be performed to configure an I/O gateway (e.g., the example I/O gateway 124 of FIG. 1). The example process of FIG. 7 begins when the I/O gateway is instructed (e.g., by an application executing on the example workstation 112) to sense and report connected field devices (e.g., the example field devices 142A-C, 152A-C). The I/O gateway acquires the device tags for field devices connected to a first I/O slice (block 705) and compares the acquired device tags to those provisioned into the I/O gateway (e.g., the example configuration 129) (block 710). If one or more of the device tags do not match (block 715), the I/O gateway displays an error indication on and/or associated with the I/O slice (block 720). The I/O gateway may, additionally or alternatively, provide a device tag mismatch indication to the workstation at block 720. An error indication may also be provided and/or displayed if device tags for one or more field devices are not available for a connected field device. If no device tag mismatch and/or missing tag error is detected (block 720), control proceeds to block 720 without displaying an error indication.

Continuing at block 720, if there are more I/O slices (block 725), control returns to block 705 to acquire the devices tags from the next I/O slice. If there are no more I/O slices, control exits from the example process of FIG. 7.

Figure 8:
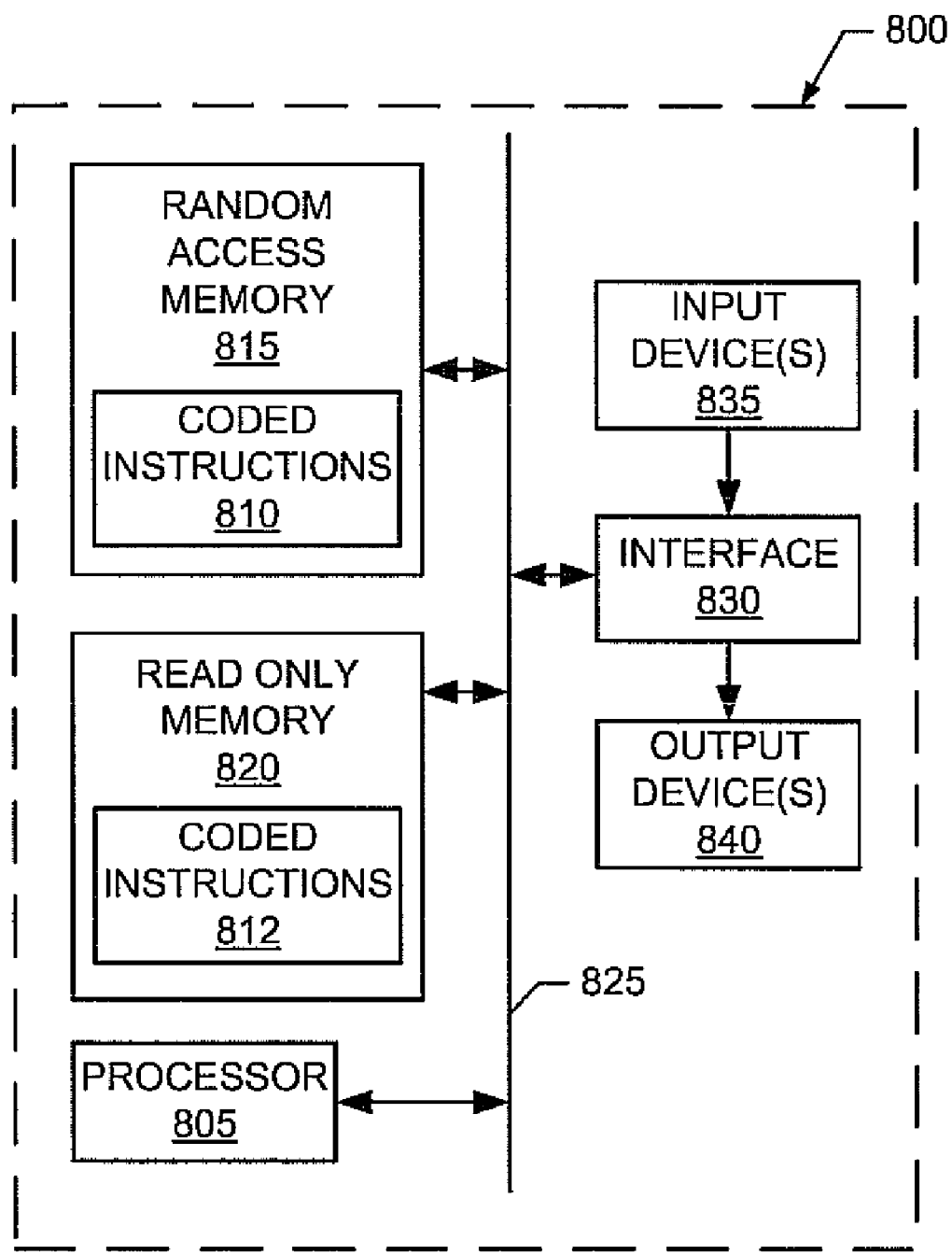
FIG. 8 is a schematic illustration of an example processor platform that may be used and/or programmed to carry out the example processes of FIGS. 3, 4, 5, 6 and/or 7 to implement any or all of the methods and apparatus described herein.

FIG. 8 is a schematic diagram of an example processor platform 800 that may be used and/or programmed to implement any or all of the example workstation 112, the example process controller 122 and/or the example I/O gateway 124 of FIG. 1. For example, the processor platform 800 can be implemented by one or more general purpose processors, processor cores, microcontrollers, etc.

The processor platform 800 of the example of FIG. 8 includes at least one general purpose programmable processor 805. The processor 805 executes coded instructions 810 and/or 812 present in main memory of the processor 805 (e.g., within a RAM 815 and/or a ROM 820). The processor 805 may be any type of processing unit, such as a processor core, a processor and/or a microcontroller. The processor 805 may execute, among other things, the example processes of FIGS. 3, 4, 5, 6 and/or 7 to implement any or all of the example workstation 112, the example process controller 122 and/or the example I/O gateway 124 described herein. The processor 805 is in communication with the main memory (including a ROM 820 and/or the RAM 815) via a bus 825. The RAM 815 may be implemented by DRAM, SDRAM, and/or any other type of RAM device, and ROM may be implemented by flash memory and/or any other desired type of memory device. Access to the memory 815 and 820 may be controlled by a memory controller (not shown). The RAM 815 may be used to store and/or implement, for example, the example configuration 129 of FIG. 1.

The processor platform 800 also includes an interface circuit 830. The interface circuit 830 may be implemented by any type of interface standard, such as a USB interface, a Bluetooth interface, an external memory interface, serial port, general purpose input/output, etc. One or more input devices 835 and one or more output devices 840 are connected to the interface circuit 830. The input devices 835 and/or output devices 840 may be used to implement, for example, the universal I/O buses 128A, 128B.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method comprising:
communicatively coupling a process control device to a channel of a multi-channel input/output port of a process controller via an input/output device;
obtaining a tag for the process control device from the input/output device;
querying based on the tag obtained from the input/output device a database of process control routines implemented by the process controller to identify a process control routine, the process control routine to control the process control device within a process plant;
communicatively coupling the identified process control routine to the channel of the multi-channel input/output port based on the database query; and
using a module class object to implement the process control routine.

2. A method as defined in claim 1, wherein the input/output device comprises an input/output slice, and the process control device comprises a field device.

3. A method as defined in claim 1, further comprising configuring the input/output device with the tag of the process control device.

4. A method as defined in claim 3, wherein configuring the input/output device with the tag of the process control device comprises:
wiring the process control device to the input/output device; and programming the process control device with the tag, wherein the input/output device obtains the tag from the process control device.

5. A method as defined in claim 3, wherein configuring the input/output device with the tag of the process control device comprises:
   wiring the process control device to the input/output device; and
   programming the input/output device with the tag.

6. A method as defined in claim 5, wherein the input/output device is programmed with the tag by an installer of the process control device.

7. A method comprising:
   communicatively coupling a process control device to a channel of a multi-channel input/output port of a process controller via an input/output device;
   obtaining a tag for the process control device from the input/output device;
   querying based on the tag obtained from the input/output device a database of process control routines implemented by the process controller to identify a process control routine, the process control routine to control the process control device within a process plant;
   communicatively coupling the identified process control routine to the channel of the multi-channel input/output port based on the database query;
   configuring the process control routine with a second tag for the process control device;
   comparing the tag obtained from the input/output device to the second tag; and
   communicatively coupling the process control routine to the channel of the multi-channel input/output port when the obtained tag matches the second tag.

8. A method comprising:
   communicatively coupling a process control device to a channel of a multi-channel input/output port of a process controller via an input/output device;
   obtaining a tag for the process control device from the input/output device, wherein obtaining the tag for the process control device from the input/output device comprises directing an input/output gateway to sense whether the input/output device is present, the input/output gateway to read the tag from the input/output device when the input/output device is present;
   querying based on the tag obtained from the input/output device a database of process control routines implemented by the process controller to identify a process control routine, the process control routine to control the process control device within a process plant; and
   communicatively coupling the identified process control routine to the channel of the multi-channel input/output port based on the database query.

9. A method comprising:
   communicatively coupling a process control device to a channel of a multi-channel input/output port of a process controller via an input/output device;
   obtaining a tag for the process control device from the input/output device;
   querying based on the tag obtained from the input/output device a database of process control routines implemented by the process controller to identify a process control routine, the process control routine to control the process control device within a process plant; and
   communicatively coupling the identified process control routine to the channel of the multi-channel input/output port based on the database query, wherein communicatively coupling the identified process control routine to the channel of the multi-channel input/output port comprises:
   comparing a channel identifier associated with the tag obtained from the input/output device to a second channel identifier configured for the identified process control routine; and
   providing an error indicator when the channel identifier and the second channel identifier do not match.

10. An article of manufacture storing machine readable instructions that, when executed, cause a machine to:
    obtain a tag of a process control device from an input/output device, the input/output device to communicatively couple the process control device to a channel of a multi-channel input/output port of a process controller;
    query based on the tag obtained from the input/output device a database of process control routines implemented by the process controller to identify a process control routine, the process control routine to control the process control device within a process plant;
    communicatively couple the process control routine to the channel of the multi-channel input/output port based on the database query; and
    use a module class object to implement the process control routine.

11. An article of manufacture as defined in claim 10, wherein the input/output device comprises an input/output slice, and the process control device comprises a field device.

12. An article of manufacture as defined in claim 10, wherein the machine readable instructions, when executed, cause the machine to configure the input/output device with the tag of the process control device.

13. An article of manufacture storing machine readable instructions that, when executed, cause a machine to:
    obtain a tag of a process control device from an input/output device, the input/output device to communicatively couple the process control device to a channel of a multi-channel input/output port of a process controller;
    query based on the tag obtained from the input/output device a database of process control routines implemented by the process controller to identify a process control routine, the process control routine to control the process control device within a process plant;
    communicatively couple the process control routine to the channel of the multi-channel input/output port based on the database query;
    configure the process control routine with a second tag for the process control device;
    compare the tag obtained from the input/output device to the second tag; and
    communicatively couple the process control routine to the channel of the multi-channel input/output port when the obtained tag matches the second tag.

14. An article of manufacture storing machine readable instructions that, when executed, cause a machine to:
    obtain a tag of a process control device from an input/output device, the input/output device to communicatively couple the process control device to a channel of a multi-channel input/output port of a process controller;
    query based on the tag obtained from the input/output device a database of process control routines implemented by the process controller to identify a process control routine, the process control routine to control the process control device within a process plant;
    communicatively couple the process control routine to the channel of the multi-channel input/output port based on the database query; and obtain the tag for the process control device from the input/output device by directing an input/output gateway to sense whether the input/output device is present, the input/output gateway to read the tag from the input/output device when the input/output device is present.

15. An article of manufacture the storing machine readable instructions that, when executed, cause a machine to:
   obtain a tag of a process control device from an input/output device, the input/output device to communicatively couple the process control device to a channel of a multi-channel input/output port of a process controller;
   query based on the tag obtained from the input/output device a database of process control routines implemented by the process controller to identify a process control routine, the process control routine to control the process control device within a process plant;
   communicatively couple the process control routine to the channel of the multi-channel input/output port based on the database query; and
   communicatively couple the process control routine to the channel of the multi-channel input/output port by:
      comparing a channel identifier associated with the tag obtained from the input/output device a second channel identifier configured for the identified process control routine; and
   providing an error indicator when the channel identifier and the second channel identifier do not match.

16. An apparatus comprising:
   a memory; and
   a processor coupled to the memory and programmed to:
      obtain a tag of a process control device from an input/output device, the input/output device to communicatively couple the process control device to a channel of a multi-channel input/output port of a process controller, wherein a configuration associates the tag with an input/output port;
      query based on the tag obtained from the input/output device a database of process control routines implemented by the process controller to identify a process control routine, the process control routine to control the process control device within a process plant;
      communicatively couple the process control routine to the channel of the multi-channel input/output port based on the database query; and
      provide an error indicator when the input/output port does not correspond to a second input/output port to which the input/output device is connected.

17. An apparatus as defined in claim 16, wherein the apparatus comprises an input/output gateway of a process control system.

18. An apparatus as defined in claim 16, wherein the input/output device is located in a marshalling cabinet for a process control system.

19. An apparatus as defined in claim 16, wherein the input/output device is implemented by an input/output slice.

20. An apparatus as defined in claim 16, wherein the processor is programmed to configure the input/output device with the tag of the process control device.

21. An apparatus to comprising:
   a memory; and
   a processor coupled to the memory and programmed to:
      obtain a tag of a process control device from an input/output device, the input/output device to communicatively couple the process control device to a channel of a multi-channel input/output port of a process controller;
      query based on the tag obtained from the input/output device a database of process control routines implemented by the process controller to identify a process control routine, the process control routine to control the process control device within a process plant;
      communicatively couple the process control routine to the channel of the multi-channel input/output port based on the database query;
      configure the process control routine with a second tag for the process control device;
      compare the tag obtained from the input/output device to the second tag; and
      communicatively couple the process control routine to the channel of the multi-channel input/output port when the obtained tag matches the second tag.

22. An apparatus comprising:
   a memory; and
   a processor coupled to the memory and programmed to:
      obtain a tag of a process control device from an input/output device, the input/output device to communicatively couple the process control device to a channel of a multi-channel input/output port of a process controller;
      query based on the tag obtained from the input/output device a database of process control routines implemented by the process controller to identify a process control routine, the process control routine to control the process control device within a process plant;
      communicatively couple the process control routine to the channel of the multi-channel input/output port based on the database query; and
      obtain the tag of the process control device from the input/output device by directing an input/output gateway to sense whether the input/output device is present, the input/output gateway to read the tag from the input/output device when the input/output device is present.

23. An apparatus comprising:
   a memory; and
   a processor coupled to the memory and programmed to:
      obtain a tag of a process control device from an input/output device, the input/output device to communicatively couple the process control device to a channel of a multi-channel input/output port of a process controller;
      query based on the tag obtained from the input/output device a database of process control routines implemented by the process controller to identify a process control routine, the process control routine to control the process control device within a process plant;
      communicatively couple the process control routine to the channel of the multi-channel input/output port based on the database query;
      compare a channel identifier associated with the tag obtained from the input/output device to a second channel identifier configured for the identified process control routine; and
      provide an error indicator when the channel identifier and the second channel identifier do not match.

* * * * *

UNITED STATES PATENT AND TRADEMARK OFFICE
CERTIFICATE OF CORRECTION

PATENT NO. : 7,684,875 B2 Page 1 of 1
APPLICATION NO. : 11/670835
DATED : March 23, 2010
INVENTOR(S) : Jundt et al.

It is certified that error appears in the above-identified patent and that said Letters Patent is hereby corrected as shown below:

Column 17, line 12 (Claim 15): Please delete "the";
"15. An article of manufacture "the" storing machine readable"

Signed and Sealed this

Twenty-fifth Day of May, 2010

David J. Kappos
*Director of the United States Patent and Trademark Office*